United States Patent
Burns, Jr.

(10) Patent No.: US 8,233,491 B2
(45) Date of Patent: Jul. 31, 2012

(54) EMBEDDED MEDIA TERMINAL ADAPTER (EMTA) ENDPOINT REDIRECT MODE

(76) Inventor: James M. Burns, Jr., Dacula, GA (US)

( * ) Notice: Subject to any disclaimer, the term of this patent is extended or adjusted under 35 U.S.C. 154(b) by 997 days.

(21) Appl. No.: 11/536,024

(22) Filed: Sep. 28, 2006

(65) Prior Publication Data

US 2008/0080690 A1    Apr. 3, 2008

(51) Int. Cl.
*H04L 12/28* (2006.01)
*H04L 12/56* (2006.01)

(52) U.S. Cl. .................. 370/395.54; 700/223; 370/466; 379/211.02

(58) Field of Classification Search .................. 709/227, 709/223, 224, 225, 226; 370/352, 360, 401, 370/353, 354, 355, 356, 357; 379/211.02, 379/207.16
See application file for complete search history.

(56) References Cited

U.S. PATENT DOCUMENTS

| | | | |
|---|---|---|---|
| 5,544,235 A | 8/1996 | Ardon | |
| 5,546,447 A | 8/1996 | Skarbo et al. | |
| 5,666,399 A * | 9/1997 | Bales et al. | 379/419 |
| 5,684,988 A * | 11/1997 | Pitchaikani et al. | 1/1 |
| 5,699,419 A | 12/1997 | Ardon | |
| 5,799,060 A | 8/1998 | Kennedy et al. | |
| 5,937,034 A | 8/1999 | Kennedy et al. | |
| 6,005,921 A | 12/1999 | Keefe et al. | |
| 6,324,263 B1 | 11/2001 | Sherwood et al. | |
| 6,898,274 B1 | 5/2005 | Galt et al. | |
| 6,937,713 B1 * | 8/2005 | Kung et al. | 379/211.02 |
| 6,940,866 B1 | 9/2005 | Miller et al. | |
| 6,985,492 B1 | 1/2006 | Thi et al. | |
| 7,002,995 B2 | 2/2006 | Chow et al. | |
| 7,006,479 B1 * | 2/2006 | Joo et al. | 370/338 |
| 7,010,002 B2 | 3/2006 | Chow et al. | |
| 7,068,757 B1 | 6/2006 | Burnett | |
| 7,103,067 B1 | 9/2006 | Singh et al. | |
| 7,116,771 B2 | 10/2006 | Charania et al. | |
| 7,123,692 B2 | 10/2006 | Atkinson et al. | |
| 7,145,887 B1 * | 12/2006 | Akgun et al. | 370/321 |
| 7,263,111 B1 * | 8/2007 | Davis et al. | 370/522 |
| 7,280,532 B2 | 10/2007 | Um | |

(Continued)

FOREIGN PATENT DOCUMENTS

CN    1108449 A    5/2003

(Continued)

OTHER PUBLICATIONS

"Access and Terminals (AT); IPCablecom Access Network; End to End Provisioning for the IPAT Architecture (Between the eMTA to the V5.2 Interface); ETSI TR 102 305," ETSI Standards, European Telecommunications Standards Institute, Sophia-Antipo, FR, vol. AT-Digital, No. V111, Mar. 2004, XPO14015619 ISSN: 0000-0001; p. 15-17, line 18, p. 31.

(Continued)

*Primary Examiner* — Ahmad Matar
*Assistant Examiner* — Kharye Pope
(74) *Attorney, Agent, or Firm* — Merchant & Gould (57) ABSTRACT

Systems and methods are disclosed for enabling an embedded media terminal adapter (EMTA) with included MIB objects to redirect a received telephone call. Based on the MIB objects, the EMTA communicates with a cable modem termination system (CMTS) to set up two service flows where one flow is set up between two EMTAs and one flow is set up between the endpoint EMTA and the NOC.

20 Claims, 9 Drawing Sheets

U.S. PATENT DOCUMENTS

| | | | |
|---|---|---|---|
| 7,295,566 B1 * | 11/2007 | Chiu et al. | 370/419 |
| 7,333,492 B2 | 2/2008 | Wu et al. | |
| 7,447,780 B2 | 11/2008 | McMahon et al. | |
| 7,502,457 B2 | 3/2009 | McBlain et al. | |
| 7,505,759 B1 | 3/2009 | Rahman | |
| 7,701,954 B2 | 4/2010 | Rabenko et al. | |
| 7,860,230 B2 | 12/2010 | Martin | |
| 2001/0055376 A1 | 12/2001 | Karas | |
| 2002/0106017 A1 | 8/2002 | Dombkowski et al. | |
| 2002/0114431 A1 | 8/2002 | McBride et al. | |
| 2002/0150081 A1 * | 10/2002 | Fang | 370/352 |
| 2003/0007617 A1 | 1/2003 | McAlinden | |
| 2003/0046427 A1 * | 3/2003 | Goringe et al. | 709/242 |
| 2003/0097438 A1 * | 5/2003 | Bearden et al. | 709/224 |
| 2003/0108176 A1 * | 6/2003 | Kung et al. | 379/211.02 |
| 2004/0008724 A1 * | 1/2004 | Devine et al. | 370/466 |
| 2004/0028208 A1 | 2/2004 | Carnazza et al. | |
| 2004/0066913 A1 | 4/2004 | Kennedy et al. | |
| 2004/0090968 A1 | 5/2004 | Kimber et al. | |
| 2004/0114747 A1 * | 6/2004 | Trandal et al. | 379/211.02 |
| 2004/0151202 A1 * | 8/2004 | Mandavilli et al. | 370/463 |
| 2004/0170268 A1 * | 9/2004 | Hakusui | 379/211.02 |
| 2004/0208177 A1 * | 10/2004 | Ogawa | 370/392 |
| 2004/0249927 A1 * | 12/2004 | Pezutti | 709/223 |
| 2005/0018651 A1 | 1/2005 | Yan et al. | |
| 2005/0047423 A1 | 3/2005 | Kaul et al. | |
| 2005/0078689 A1 * | 4/2005 | Sharma et al. | 370/401 |
| 2005/0114518 A1 * | 5/2005 | McMahon et al. | 709/227 |
| 2005/0180393 A1 | 8/2005 | Skubisz | |
| 2005/0190891 A1 * | 9/2005 | Shah et al. | 379/1.03 |
| 2005/0198391 A1 | 9/2005 | Coldren | |
| 2005/0216949 A1 | 9/2005 | Candelora et al. | |
| 2006/0285487 A1 * | 12/2006 | Yasuie et al. | 370/216 |
| 2006/0291643 A1 | 12/2006 | Pfaff et al. | |
| 2007/0133516 A1 | 6/2007 | Stein | |
| 2007/0133776 A1 | 6/2007 | Jain et al. | |
| 2007/0140445 A1 | 6/2007 | Ito | |
| 2007/0198681 A1 | 8/2007 | Bakke et al. | |
| 2007/0201473 A1 | 8/2007 | Bhatia et al. | |
| 2007/0201481 A1 | 8/2007 | Bhatia et al. | |
| 2007/0218866 A1 | 9/2007 | MacIver et al. | |
| 2007/0274213 A1 * | 11/2007 | Stephan et al. | 370/235 |
| 2007/0297384 A1 | 12/2007 | Burns et al. | |
| 2008/0043927 A1 | 2/2008 | Lysaght et al. | |
| 2008/0043970 A1 | 2/2008 | Scholes et al. | |
| 2008/0080680 A1 | 4/2008 | Burns | |
| 2008/0123627 A1 | 5/2008 | Moreman et al. | |
| 2008/0168517 A1 | 7/2008 | Allen | |
| 2009/0143013 A1 | 6/2009 | Hatano et al. | |
| 2009/0185665 A1 | 7/2009 | Chen | |

FOREIGN PATENT DOCUMENTS

| | | |
|---|---|---|
| CN | 1711744 A | 12/2005 |
| WO | WO 03028355 | 4/2003 |
| WO | WO 03/077509 | 9/2003 |
| WO | WO2004/045130 | 5/2004 |
| WO | WO 2006/015013 A2 | 2/2006 |
| WO | WO 2007/149708 A2 | 12/2007 |
| WO | WO 2008/016864 A1 | 2/2008 |
| WO | WO 2008/039719 A2 | 4/2008 |
| WO | WO 2008/039721 A2 | 4/2008 |
| WO | WO 2008/042636 A2 | 4/2008 |

OTHER PUBLICATIONS

Gordon Beacham Motorola et al., "Network Control Signaling (NCS) Signaling MIB for PacketCable and IPCablecom Multimedia Terminal Adapters (MTAs); draft-ietf-ipcdn-pktc-signaling-02.txt;" IETF Standard-Working Draft; Internet Engineering Task Force, IETF, CH, vol. ipcdn, No. 2, Oct. 2003, XP015019953 ISSN: 0000-0004; p. 3, p. 27.

Eugene Nechamkin Broadcom Corp, Jean-Francois Mule Cablelabs: "Multimedia Terminal Adapter (MTA) Management Information Base for PacketCable and IPCablecom compliant devices; draft-ietf-ipcdn-pktc-mtamib-06.txt," IETF Standard-Working-Draft, Internet Engineering Task Force, IETF, CH, vol. ipcdn, No. 6, Jan. 21, 2005, XP015019952, ISSN: 0000-0004, pp. 5-7, p. 28, line 29.

U.S. Appl. No. 11/461,487, filed Aug. 1, 2006, Entitled "Media Terminal Adapter Routing of Telephone Calls Based on Caller Identification Information," Inventors: Scholes et al.

U.S. Appl. No. 11/461,487, filed Jun. 22, 2006, Entitled "Media Terminal Adapter Initialization Process Display by Use of an Embedded Caller Name and Caller Identification," Inventors: Burns et al.

U.S. Appl. No. 11/536,727, filed Sep. 29, 2006, Entitled "Media Terminal Adapter Local Ringback Option," Inventors: Burns, James M.

U.S. Appl. No. 11/535,201, filed Sep. 26, 2006, Entitled "Media Terminal Adapter with Session Initiation Protocol (SIP) Proxy," Inventors: Moreman, et al.

Luan Dang, Cullen Jennings, David Kelly—Practical VOIP using VOCAL, 2002, 28 pgs.

F. Cuervo et al., "Megaco Protocol Version 1.0," RFC 3015, Lucent Technologies, Nov. 2000, 220 pgs.

M. Handley et al., "SIP: Session Initiation Protocol," RFC 2543, Bell Labs, Mar. 1999, 187 pgs.

James Dahl, "Draft new ITU-T Recommendation J.ipc2arch—IPCablecom 2 Architecture Framework," COM 9-C 37-E, Aug. 2005, International Telecommunication Union, Telecommunication Standardization Sector Study Period 2005-2008, 38 pgs.

Fred Baker et al., "Cisco Architecture for Lawful Intercept In IP Networks," Internet Engineering Task Force, Internet Draft, No. 2, Oct. 2003, XP015010527 ISSN: 0000-0004, 17 pgs.

F. Baker, "Cisco Lawful Intercept Control MIB draft-baker-slem-mib-00," Cisco Systems, Internet-Draft, Sep. 30, 2003, XP015000178 ISSN: 0000-0004, 39 pgs.

International Search Report and Written Opinion mailed Dec. 28, 2007 cited in Application No. PCT/US2007/070692.

International Search Report and Written Opinion mailed Dec. 28, 2007 cited in Application No. PCT/US2007/074688.

International Search Report and Written Opinion dated Mar. 10, 2008 cited in PCT/US2007/079313.

International Search Report and Written Opinion mailed Mar. 18, 2008 cited in PCT/US2007/079309.

International Search Report and Written Opinion mailed Mar. 25, 2008 cited in PCT/US2007/079307.

European Communication dated Jun. 4, 2009 cited in Application No. 07 798 275 9.

European Communication dated Sep. 30, 2009 cited in Application No. 07 853 604.2.

International Preliminary Report on Patentability mailed Mar. 10, 2010 cited in PCT/US2007/079313.

European Communication dated Apr. 9, 2010 cited in Application No. 07 853 608.3.

U.S. Office Action dated Dec. 20, 2007 cited in U.S. Appl. No. 11/535,201.

U.S. Office Action dated Jun. 13, 2008 cited in U.S. Appl. No. 11/535,201.

U.S. Office Action dated Oct. 16, 2008 cited in U.S. Appl. No. 11/535,201.

U.S. Office Action dated Mar. 5, 2009 cited in U.S. Appl. No. 11/535,201.

U.S. Office Action dated Sep. 4, 2009 cited in U.S. Appl. No. 11/535,201.

U.S. Office Action dated Sep. 30, 2009 cited in U.S. Appl. No. 11/425,862.

U.S. Office Action dated Dec. 10, 2009 cited in U.S. Appl. No. 11/461,487.

U.S. Office Action dated Mar. 17, 2010 cited in U.S. Appl. No. 11/425,862.

U.S. Office Action dated May 24, 2010 cited in U.S. Appl. No. 11/461,487.

U.S. Office Action dated Jun. 7, 2010 cited in U.S. Appl. No. 11/536,727.

U.S. Final Office Action dated Nov. 16, 2010 cited in U.S. Appl. No. 11/536,727.

Canadian Office Action dated Mar. 25, 2011 cited in Application No. 2,659,639.

Canadian Office Action dated Jan. 27, 2011 cited in Application No. 2,655,422.

U.S. Office Action dated Mar. 4, 2011 cited in U.S. Appl. No. 11/536,727.
Chinese First Office Action dated Mar. 16, 2011 cited in Application No. 200780023103.8.
U.S. Office Action dated Apr. 28, 2011 cited in U.S. Appl. No. 11/461,487.
Canadian Office Action dated Jan. 31, 2012 cited in Application No. 2,655,422.
Canadian Office Action dated Sep. 8, 2011 cited in Application No. 2,655,422.
Canadian Office Action dated Feb. 10, 2012 cited in Application No. 2,659,639, 3 pgs.
U.S. Final Office Action dated Aug. 11, 2011 cited in U.S. Appl. No. 11/536,727.
U.S. Final Office Action dated Sep. 2, 2011 cited in U.S. Appl. No. 11/461,487.
Chinese Second Office Action dated Feb. 13, 2012 cited in Application No. 200780023103.8, 10 pgs.
U.S. Office Action dated Apr. 12, 2012 cited in U.S. Appl. No. 11/425,862, 16 pgs.
Canadian Office Action dated May 4, 2012 cited in Application No. 2,664,578, 5 pgs.
Canadian Office Action dated May 22, 2012 cited in Application No. 2,664,793, 2 pgs.

* cited by examiner

EMBEDDED MEDIA TERMINAL ADAPTER (EMTA) ENDPOINT REDIRECT MODE

FIELD OF THE INVENTION

This invention relates in general to voice over Internet Protocol systems over broadband, more specifically broadband over coaxial cable, and more particularly, to the field of enabling a media terminal adapter to redirect a telephone call to a second endpoint.

BACKGROUND OF THE INVENTION

Multiple services operators (MSOs) are now capable of providing many services in addition to broadcast audio/video signals over their existing systems. Some advanced services in a broadband communications system provide conventional cable television signals along with other telephony services, such as high-speed data and telephone. To support these additional services, cable modems and media terminal adapters (MTAs), which is also known as embedded media terminal adapters (EMTAs) when the cable modem is included in an MTA, are used in the subscriber's premises and have typically been coupled with coaxial cable to a communications network. U.S. Pat. No. 6,161,011 to Loveless, the disclosure and teachings of which are incorporated herein by reference, shows an example of a hybrid fiber/coaxial (HFC) communications network that could be used to implement the present invention.

Public switched telephone networks (PSTNs) traditionally carry voice signals using a circuit-switched infrastructure. This infrastructure lends itself easily to a Network Operation Center (NOC) intercepting a call that is in progress at multiple points throughout the network to assess the voice quality. On the other hand, a Voice over Internet Protocol (VoIP) network in a broadband communications system uses IP packets to route telephone calls. Due to the nature of IP packet routing, which can take many different paths in the system, it is extremely difficult to intercept a call and determine possible problems.

Thus, there exists a need for a more efficient system and method of intercepting a telephone call in a VoIP communications system.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION

Preferred embodiments of the invention can be understood in the context of a broadband communications system. Note, however, that the invention may be embodied in many different forms and should not be construed as limited to the embodiments set forth herein. All examples given herein, therefore, are intended to be non-limiting and are provided in order to help clarify the description of the invention.

The present invention is directed towards enabling a destination EMTA, i.e., an endpoint EMTA, to redirect a received telephone call in a VoIP communication system. MIB objects are downloaded to the endpoint EMTA specifying a redirected endpoint address, e.g., a NOC or other customer service department, and a control function, which enables the redirect mode. Accordingly, a technician in the NOC is able to receive the redirected voice packets of a phone call. In this manner, a technician is able to troubleshoot the call in order to determine any quality problems.

Figure 1:
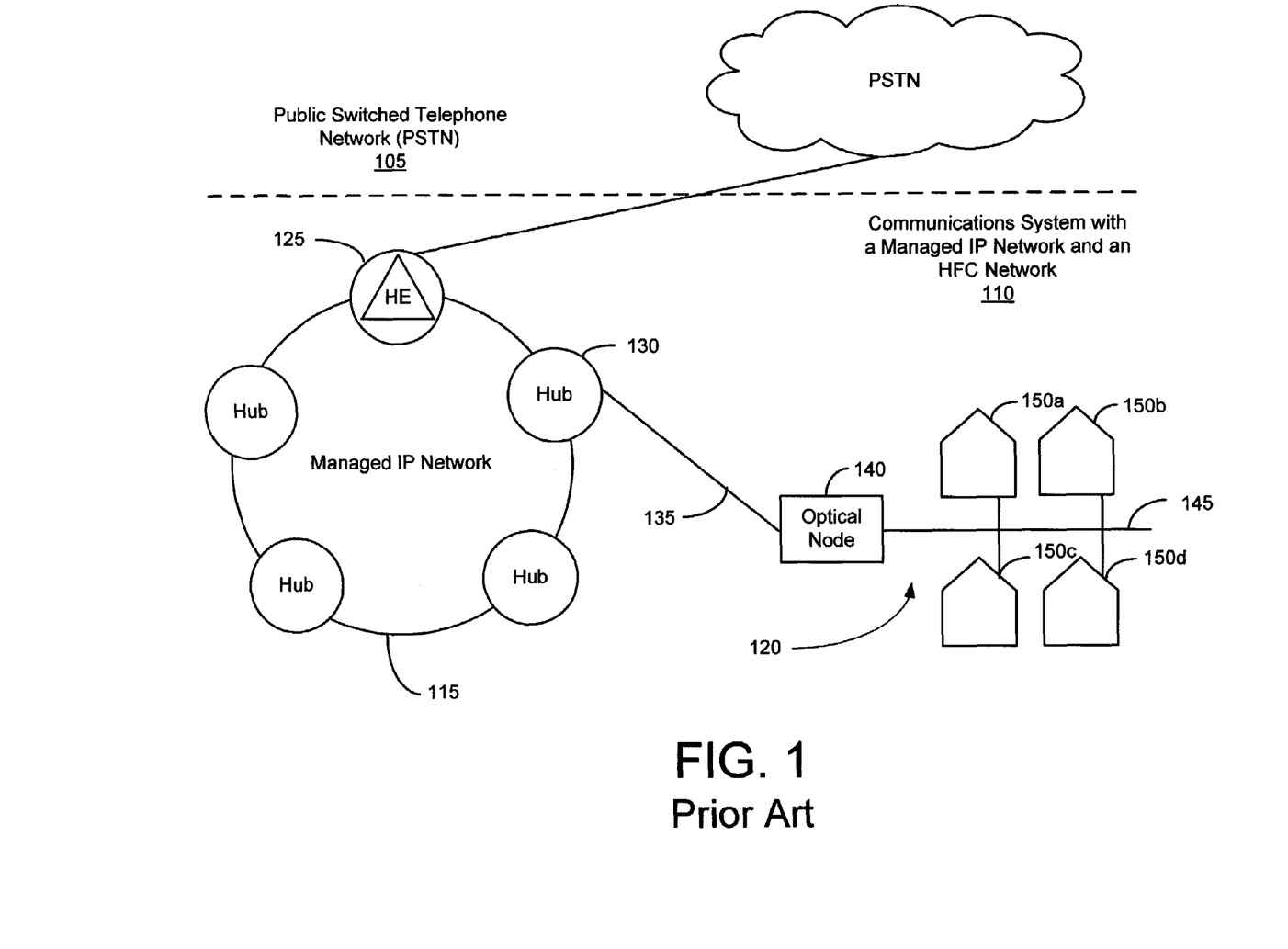
FIG. 1 is a block diagram of a PSTN and a VoIP communications system that are suitable for transmitting voice and data signals.

FIG. 1 is a block diagram of a PSTN 105 and a VoIP communications system 110 that are suitable for transmitting voice and data signals. The VoIP communications system 110 typically includes a managed Internet Protocol (IP) network 115 and a plurality of HFC networks, where only one HFC network 120 is shown. A headend facility 125 transmits, receives, and manages video, audio, and data signals with a plurality of headend equipment. In a VoIP communications system 110, voice packets are routed throughout the IP network 115 to various HFC networks via a connected hub 130 depending upon a destination address(es). Optical fiber 135 transports the voice packets to an optical node 140 for conversion into electrical signals. Coaxial cable 145 then delivers the converted electrical signal containing voice packets to an intended subscriber 150a-d. As mentioned, operators are generally able to intercept voice packets at multiple points throughout the PSTN 105 due to the nature of the circuit-switched environment. In contrast, operators are not able to intercept voice packets as readily in a VoIP system 110 due to the many different routes voice packets may take throughout the system 110, as well as far-end echo that prohibits proper analyzing of the voice packets.

Figure 2:
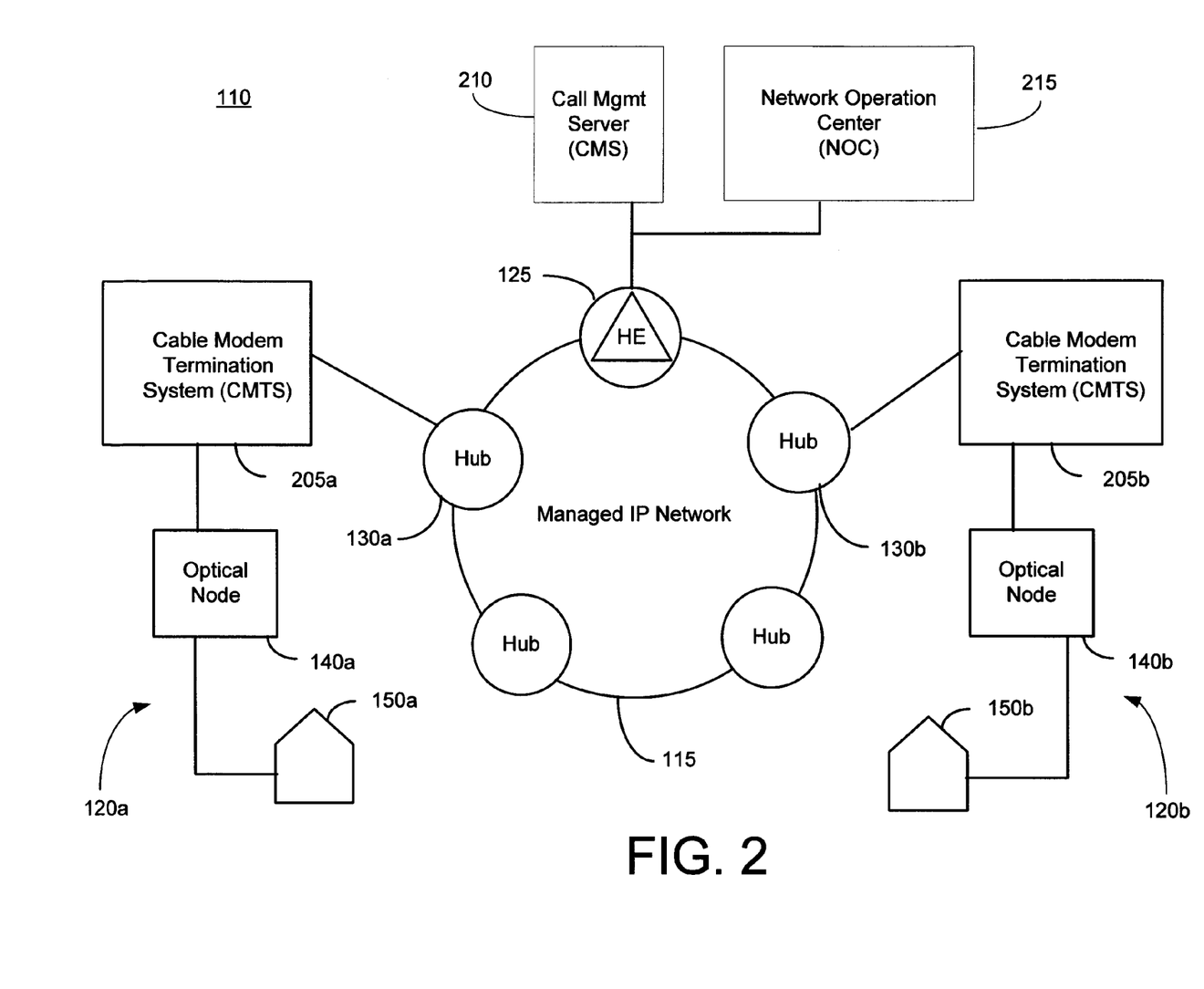
FIG. 2 is a block diagram of the VoIP communications system of FIG. 1 including call routing equipment that is suitable for use in the present invention.

FIG. 2 is a block diagram of the VoIP communications system 110 of FIG. 1 including call routing equipment that is suitable for use in the present invention. Routing equipment includes a plurality of CMTSs 205a-b that connects to all cable modems or EMTAs in the system 110. The CMTSs 205a-b are also the connectivity point between the IP network 115 and an HFC network 120a-b. A call management server (CMS) 210, also known as a softswitch, controls the video and audio call connections. Additionally, a NOC 215, or other customer service organization, includes people and other technical equipment in order to service the VoIP communications system 110.

Figure 3:
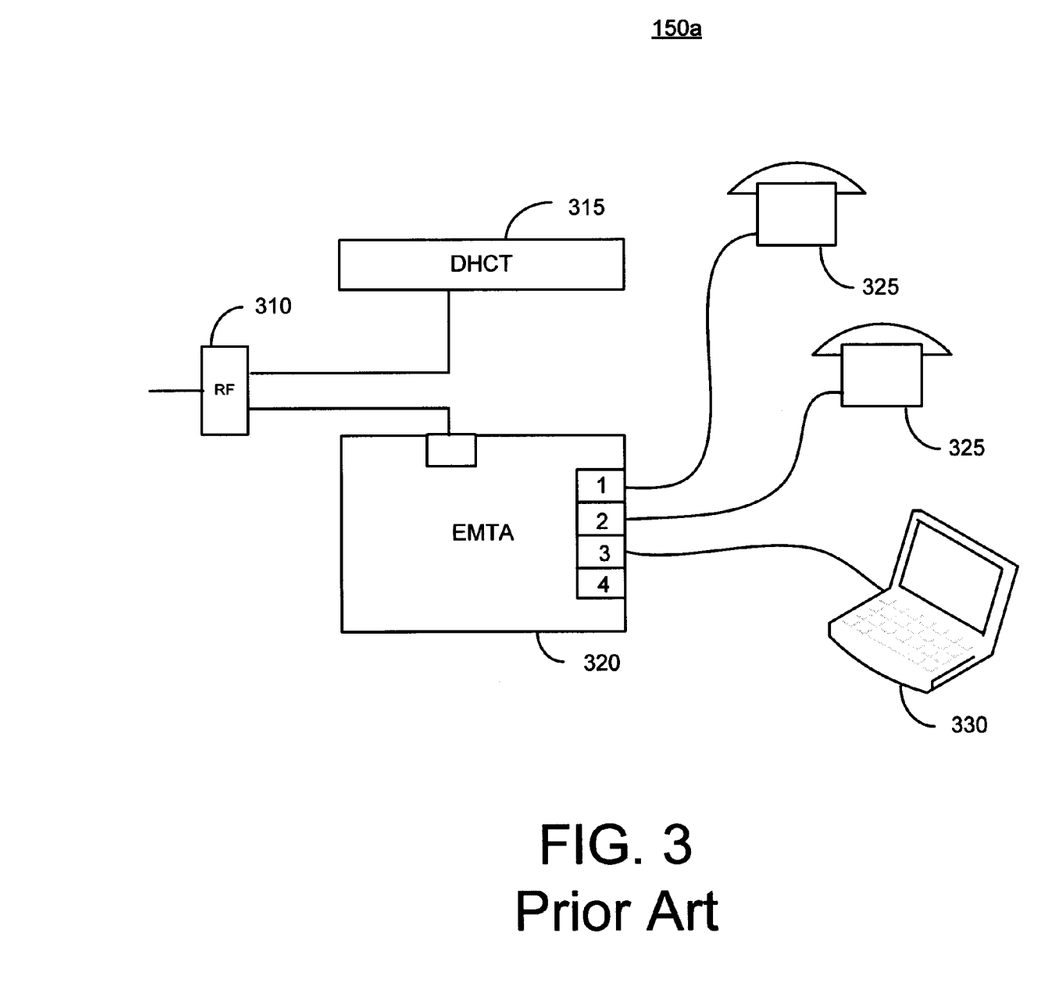
FIG. 3 is a block diagram of a subscriber's premise including an EMTA coupled to telephones and a computer that is suitable for use in the system of FIG. 2.

FIG. 3 is a block diagram of a subscriber's premise 150a including an EMTA 320 coupled to telephones 325 and a computer 330 that is suitable for use in the system of FIG. 2. A radio frequency (RF) splitter 310 receives the incoming signals and routes the signals to a DHCT 315 and an EMTA 320. The DHCT 315 processes cable television packets for display subsequent display on a television. The EMTA 320 processes and routes all received voice and data packets to an appropriate endpoint telephone 325 and/or computer 330.

Figure 4:
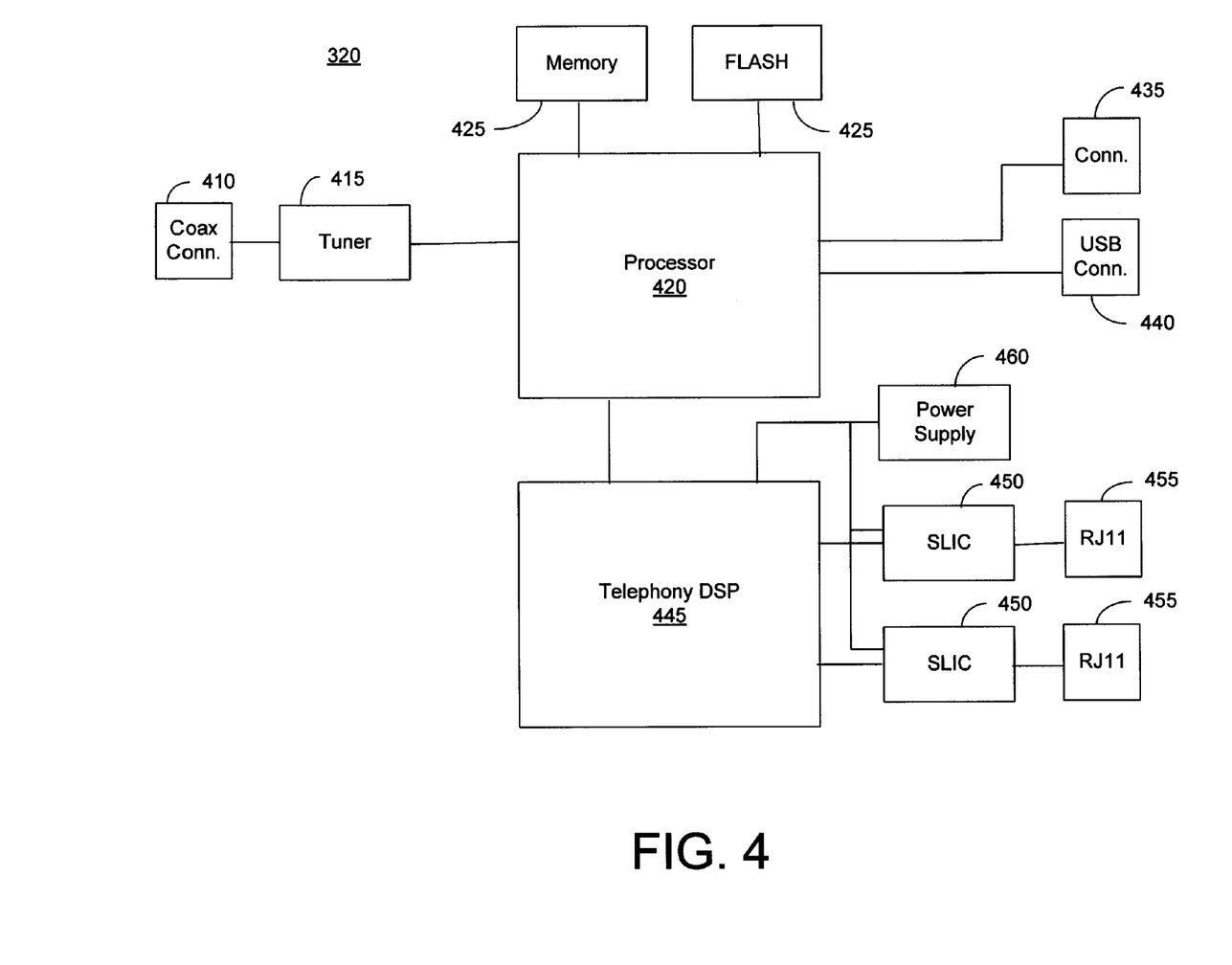
FIG. 4 is a block diagram of the EMTA of FIG. 3.

FIG. 4 is a more detailed block diagram of the EMTA of FIG. 3. A coaxial F connector 410 connects the EMTA 320 to the VoIP communications system 110. A tuner 415 then receives and filters data intended for the EMTA 320 and routes the data to a processor 420. If the data is intended for a coupled computer, the processor 420 routes the data to either an Ethernet connector 435 or a USB connector 440 depending upon the application. If the data is telephony data, the data is routed to a telephony digital signal processor (DSP) 445 for further processing, such as code decoding, packetization, echo cancellation, or other telephone signal processing. The telephony data is then routed to a connected telephone 325 and/or computer softphone 330 via a subscriber line interface chip (SLIC) 450. The telephone 325 and computer 330 are typically connected to the EMTA 320 with CAT-3 or CAT-5 wiring and an RJ11 telephone jack 455. The EMTA 320 also includes a power supply 460 for powering the telephony DSP 445 and the SLICs 450 as well as memory 425, such as SDRAM and Flash memory, for system storage purposes.

Figure 5:
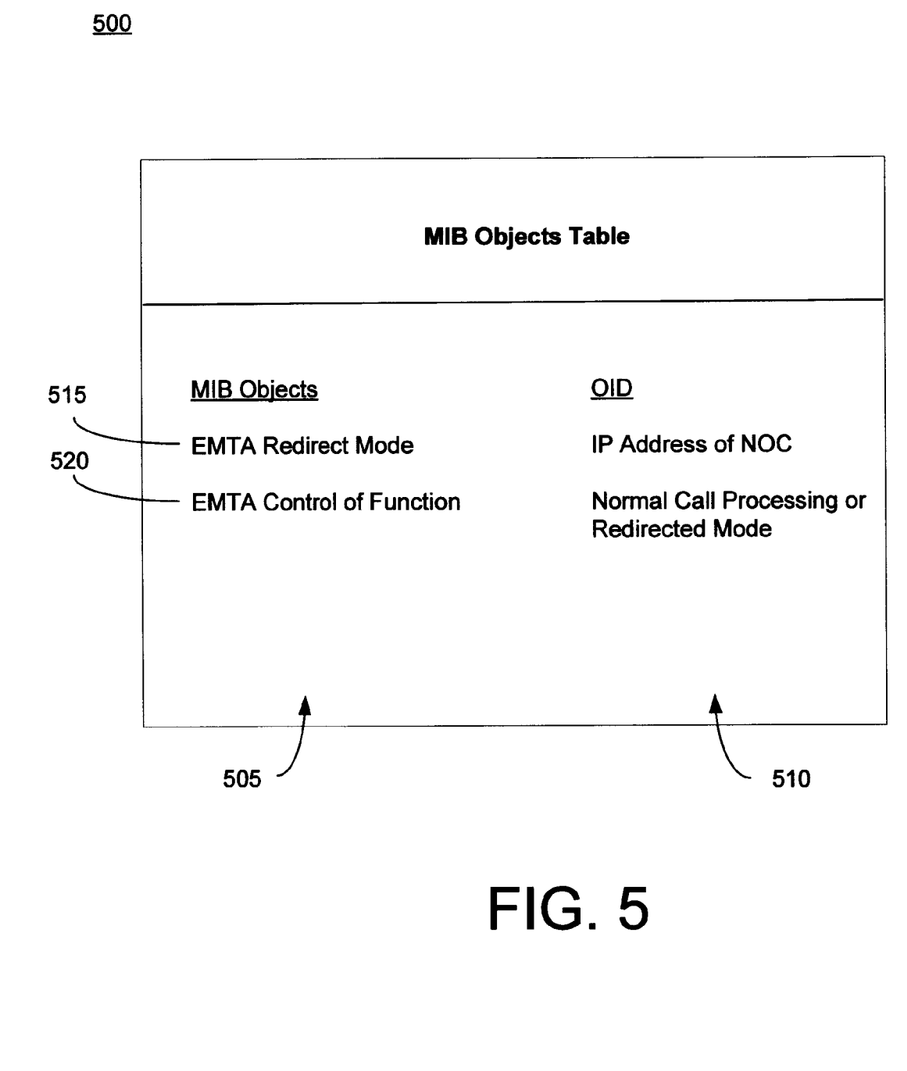
FIG. 5 is a table illustrating management information base (MIB) objects table in accordance with the present invention.

FIG. 5 is a table illustrating management information base (MIB) objects table 500 in accordance with the present invention. The MIB objects table 500 generally may be included in non-volatile memory of the EMTA 320 or it may be a downloadable configuration file. In the present invention, a subscriber 150b that may be experiencing audio problems may have a MIB objects downloaded to their EMTA 320. The downloaded MIB objects and the associated operation identification number (OID) 510, i.e., the object's numbering scheme, are stored in the MIB objects table 500. Accordingly, a first MIB object 515 designating an EMTA redirect address is given an IP address of the NOC. A second MIB object 520 enables redirected mode. The redirect mode may be disabled by downloading another MIB object returning the control function 520 to normal call processing.

Figure 6:
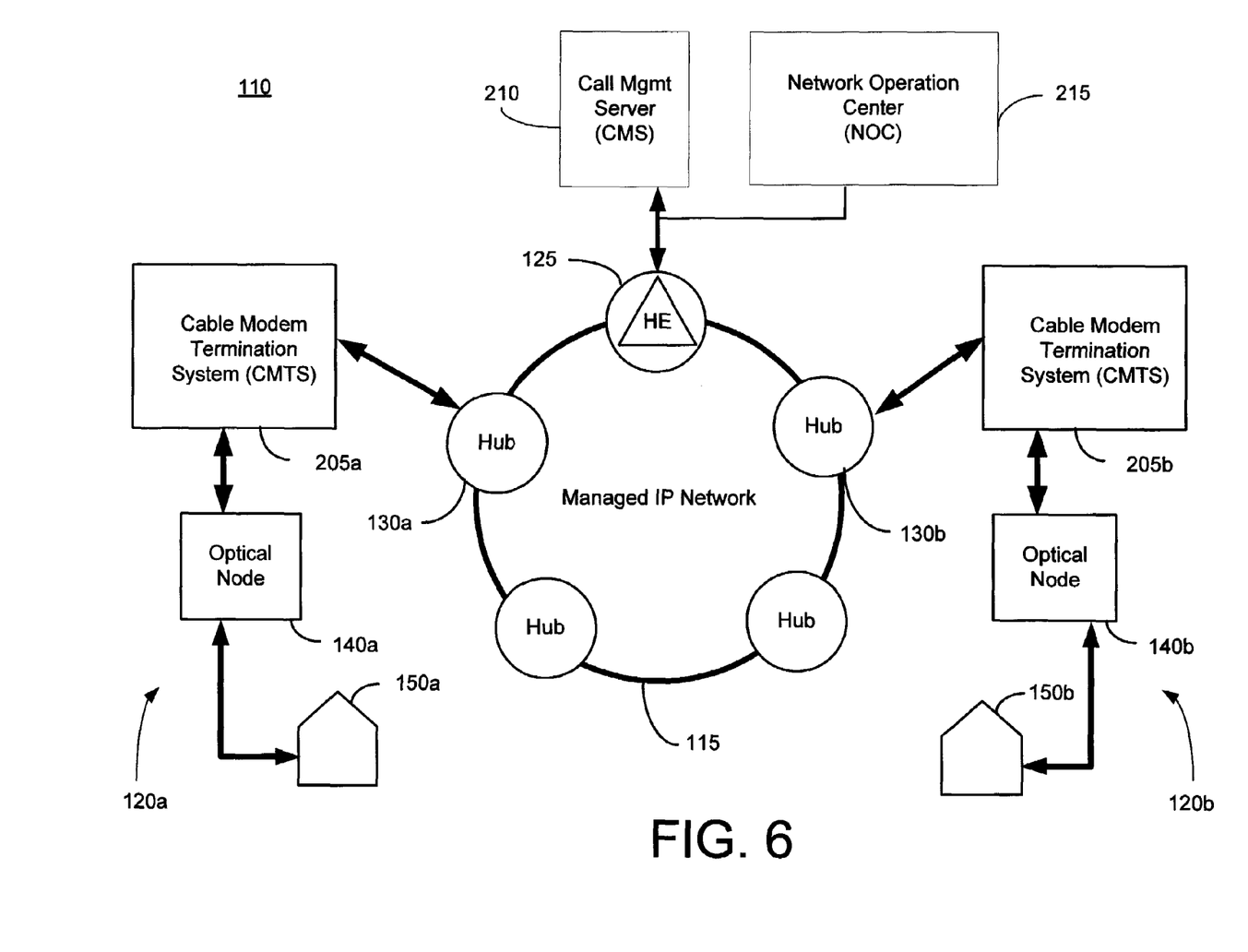
FIG. 6 is a block diagram illustrating a conventional call flow throughout the VoIP communications system of FIG. 2.
Figure 7:
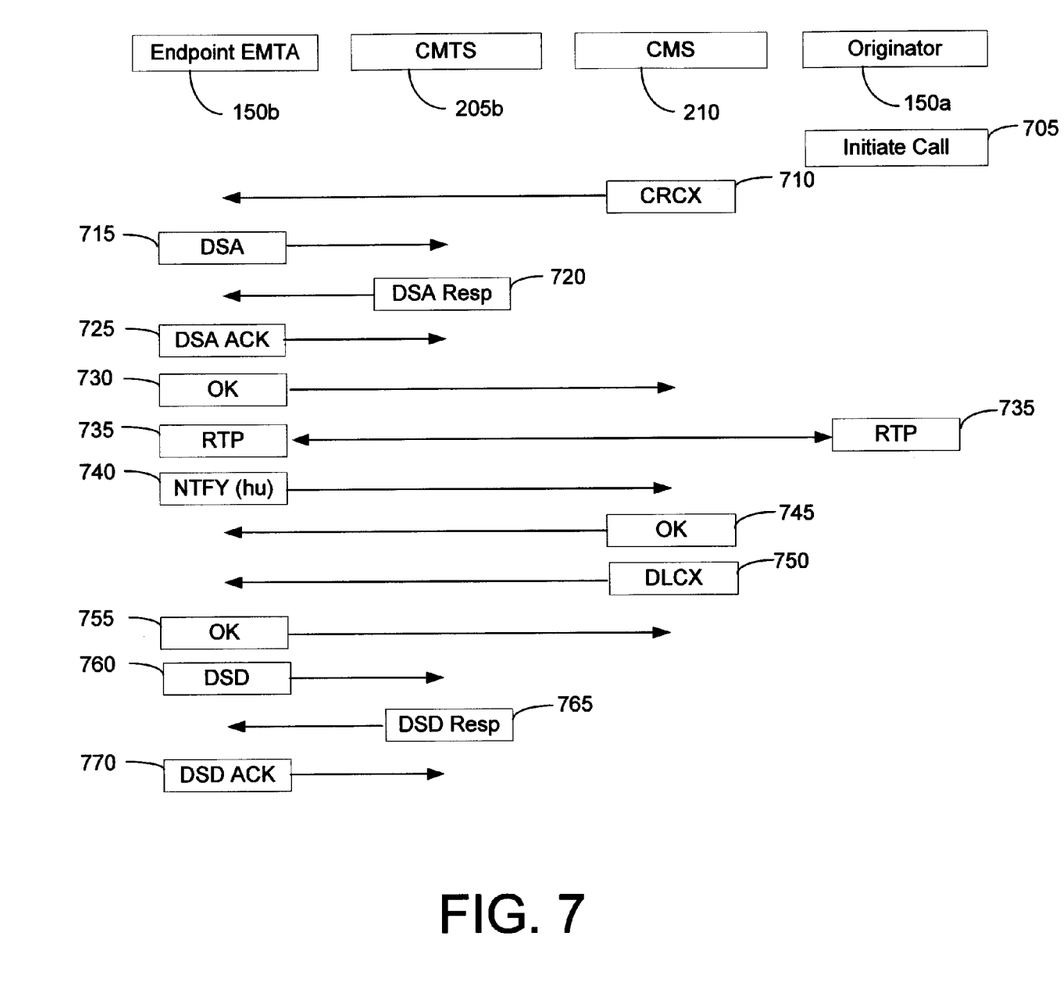
FIG. 7 is an abridged illustration of steps included in the conventional call flow of FIG. 6.

FIG. 6 is a block diagram illustrating a conventional call flow throughout the VoIP communications system 110, and FIG. 7 is an abridged illustration of steps included in the conventional call flow of FIG. 6. Referencing FIGS. 6 and 7, when an originating subscriber 150a initiates placing a call from either a telephone 325 or a computer softphone in step 705, the subscriber's EMTA 320a may identify and verify a dialed valid number by an included digit map. Alternatively, the CMS 210 may perform this function. Once verified, the EMTA 320a builds a packet that contains information about the EMTA 320a and the number dialed. Also included in the packet is a destination IP address of the CMS 210. Accordingly, the packet is routed to the subscriber's CMTS 205a and then on to the CMS 210. The CMS 210 searches a database to determine the CMTS that serves the destination dialed telephone and then routes the voice packets through the IP network 115 to the correct hub 130b, which routes the voice packets to the determined CMTS 205b. The CMS 210 then creates a connection (CRCX) in step 710 with the destination EMTA 150b, i.e., endpoint EMTA, in step 710. The endpoint EMTA 150b sets up a dynamic service add (DSA) in step 715, which sets up a service flow with its associated CMTS 205b. The CMTS 205b sends a response in step 720 that is acknowledged by the endpoint EMTA 150b in step 725. The endpoint EMTA 150b then sends an acknowledgement of the last command in step 730 to the CMS 210, and an open line of communication is then set up between the callers 150a, 150b allowing for the voice packets to be freely transmitted using real time protocol (RTP) in step 735.

In step 740, when the call is over, a notify hang up signal is sent from the endpoint EMTA 150b to the CMS 210. The CMS 210 in steps 745 and 750 acknowledges the command and deletes the connection (DLCX). The endpoint EMTA 150b acknowledges the DLCX command in step 755 and, in step 760, sends a dynamic service delete (DSD) to the CMTS 250b deleting the service. The CMTS 250b responds in step 765, and the endpoint EMTA 150b acknowledges in step 770, thereby ending the call.

Figure 8:
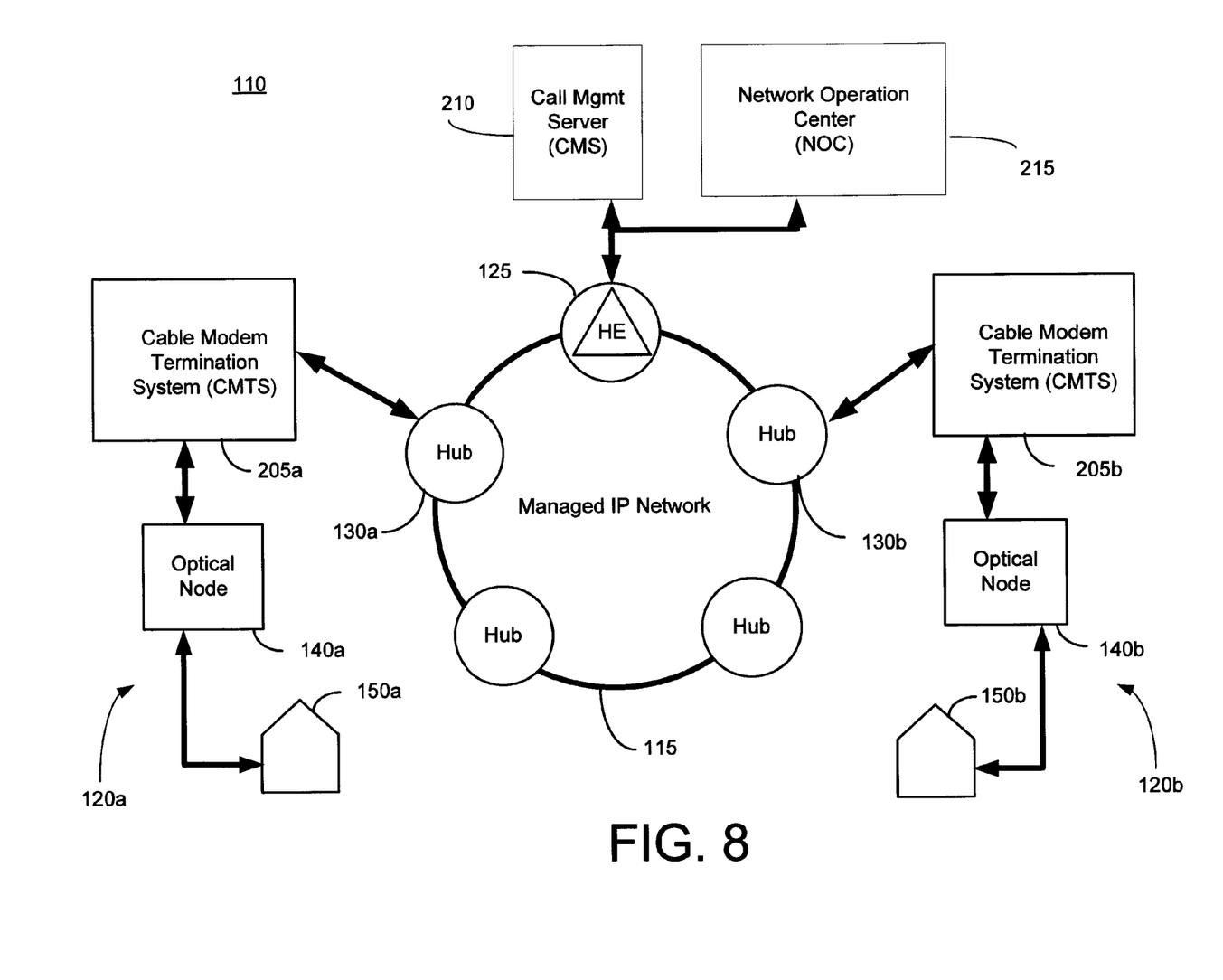
FIG. 8 is a block diagram illustrating a redirected call flow throughout the VoIP communications system of FIG. 2 in accordance with the present invention.
Figure 9:
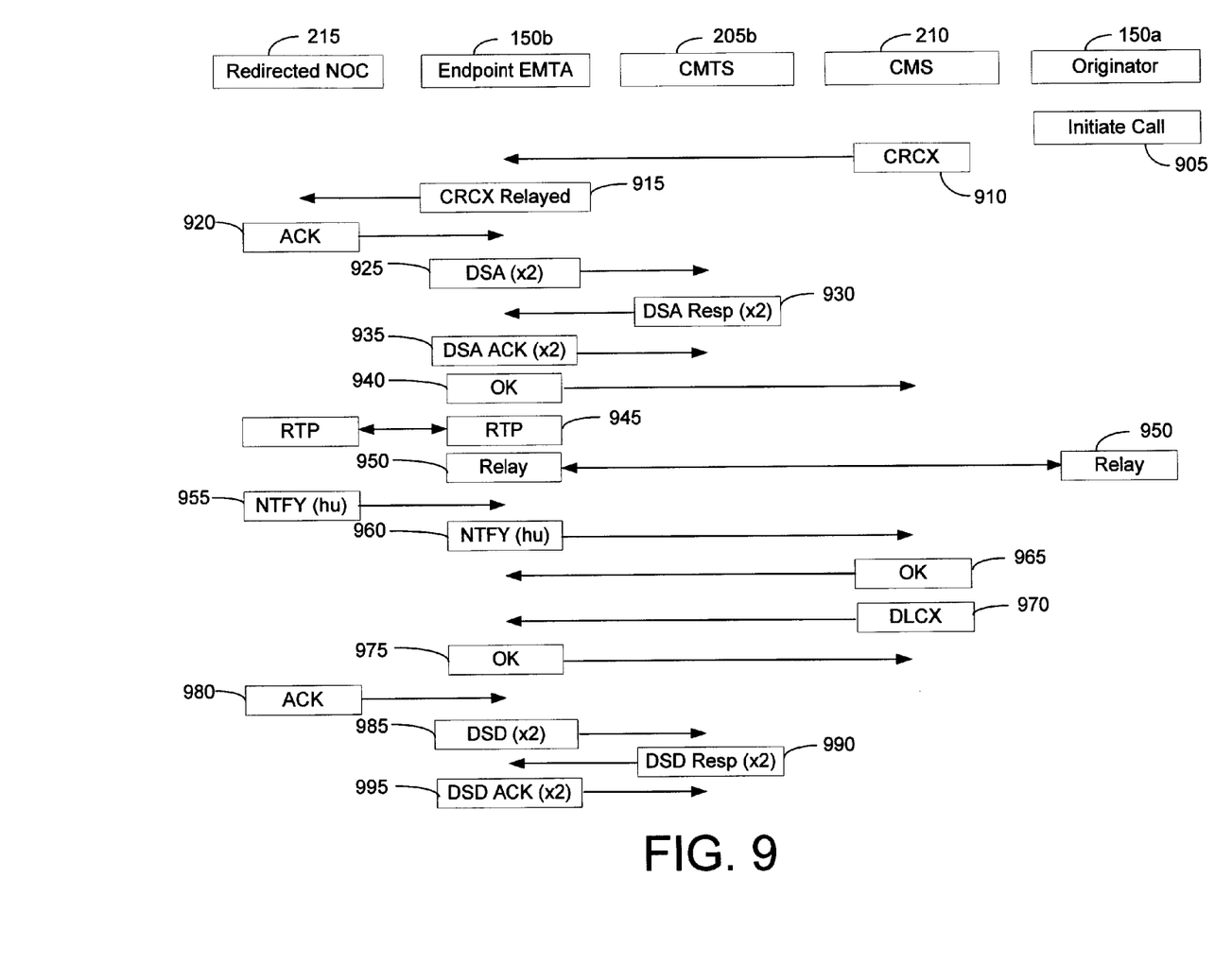
FIG. 9 is an abridged illustration of steps included in the redirected call flow of FIG. 8 in accordance with the present invention.

FIG. 8 is a block diagram illustrating a redirected call flow throughout the VoIP communications system of FIG. 2, and FIG. 9 is an abridged illustration of steps included in the redirected call flow of FIG. 8 in accordance with the present invention. Referencing FIGS. 8 and 9, an originating subscriber 150a initiates a call in step 905. After verifying the dialed number, the subscriber's EMTA 320a builds a packet that contains information about the EMTA 320a and the number dialed. Also included in the packet is a destination IP address of the CMS 210. Accordingly, the packet is routed to the subscriber's CMTS 205a and then on to the CMS 210. The CMS 210 searches a database to determine the CMTS that serves the destination dialed telephone and then routes the voice packets through the IP network 115 to the correct hub 130b, which routes the voice packets to the determined CMTS 205b. The CMS 210 then creates a connection (CRCX) in step 910 with the endpoint EMTA 150b in step 710.

In accordance with the present invention, MIB object enabling the redirected mode along with the NOC address are downloaded to the endpoint EMTA 150b. Accordingly, the endpoint EMTA 150b relays the CRCX command to the NOC 215 in step 915, and the NOC sends an acknowledgement in step 920. The endpoint EMTA 150b then sets up two dynamic service adds (DSAs) in step 925, which sets up two separate service flows with its associated CMTS 205b first with the calling endpoint 150a and a second service flow with the NOC 215. The CMTS 205b sends a response for the two service flows in step 930 that is acknowledged by the endpoint EMTA 150b in step 935. The endpoint EMTA 150b then sends an acknowledgement of the last command in step 940 to the CMS 210. In steps 945 and 950, an open line of communication is then set up between the endpoint EMTA 150b and the NOC 215 to route RTP voice packets; in addition, a relay is set up allowing for the voice packets to be relayed between the endpoint EMTA 150b and the originator 150a. In this manner, the NOC 215 receives all voice packets for analyzing.

In step 960, when the call is over, a notify hang up signal is sent from the endpoint EMTA 150b to the CMS 210. The CMS 210 in steps 965 and 970 acknowledges the command and deletes the connection (DLCX). The endpoint EMTA 150b acknowledges the DLCX command in step 975 and, in step 980, the NOC 215 sends an acknowledgement signal. The endpoint EMTA 150b sends a dynamic service delete (DSD) to the CMTS 250b deleting the two services in step 985. The CMTS 250b responds in step 990, and the endpoint EMTA 150b acknowledges in step 995, thereby ending the call.

It will be appreciated that a solution to redirecting a call cannot be accomplished with conventional call forwarding. Call forwarding instructions are handled with the CMS 210, not with the EMTA 150a-d. Accordingly, a call initiated by a subscriber with an initiating EMTA 150a is routed to the appropriate endpoint by the CMS 210. The CMS 210 determines that the desired endpoint subscriber 150b has enabled call forwarding and immediately responds to the initiating EMTA 150a to route the call to the forwarded number not the endpoint EMTA 150*b*. At this point, the NOC 215 cannot determine any issues that the endpoint EMTA 150*b* may be experiencing since the call is not routed to that point.

Accordingly, systems and methods have been provided that enables an EMTA to redirect calls in order for reasons such as testing and troubleshooting. It is understood that though the examples described in the description are directed towards an on-net call, i.e., calls within the VoIP communications system 110, the system and methods described also apply to an off-net call, i.e., a call received from the PSTN 105. Additionally, careful attention to security should be required due to the redirecting of telephone calls. It will be appreciated that further embodiments are envisioned that implement the invention, for example, using all software or adding modes for additional features and services.

What is claimed is:

1. A method comprising:
   downloading, to a computing device, management information base (MIB) objects, wherein a first MIB object specifies a redirect address and a second MIB object specifies enabling a redirect mode;
   storing the MIB objects a MIB objects table, wherein each MIB object is stored with an associated operation identification number, wherein the operation identification number associated with the first MIB object is a numerical representation of the redirect address and the operation identification number associated with the second MIB object is a numerical representation of the redirect mode;
   receiving a redirect enable signal and the redirected address at a desired endpoint;
   receiving a call signal at the desired endpoint;
   based on the redirect enable signal, redirecting voice packets associated with the call signal to the redirected address according the redirect mode, and
   receiving a redirect disable signal at the desired endpoint, wherein receiving the redirect disable signal at the desired endpoint comprises:
      receiving a third MIB object at the desired endpoint, wherein the third MIB object specifies the disabling of the redirect mode, and
      replacing the second MIB object with the third MIB object.

2. The method of claim 1, further comprising the steps of: setting up two service flows for the voice packets, wherein a first service flow is between the desired endpoint and the redirected address and a second service flow is between the desired endpoint and an originating endpoint.

3. The method of claim 2, further comprising the steps of: receiving a hang up signal from the redirected endpoint; and
   terminating the two service flows.

4. The method of claim 2, wherein the originating endpoint is one of a telephone, computer softphone, and wireless telephone.

5. The method of claim 1, further comprising the step of transmitting the call signal from the desired endpoint to at least one of a coupled telephone and computer softphone of the call signal.

6. The method of claim 1, further comprising the step of creating a connection between an originating endpoint and the desired endpoint.

7. The method of claim 6, further comprising the step of deleting the connection upon receiving a hang up signal.

8. An embedded media terminal adapter (EMTA) comprising:
   management information base (MIB) objects, wherein a first MIB object specifies a redirect address, a second MIB object specifies enabling a redirect mode, and a third MIB object specifies disabling of the redirect mode, wherein the MIB objects are stored in a MIB objects table, wherein each MIB object is stored with an associated operation identification number, wherein the operation identification number associated with the first MIB object is a numerical representation of the redirect address and the operation identification number associated with the second MIB object is a numerical representation of the redirect mode; and
   a processor for:
      receiving a call signal from an originating endpoint and for redirecting voice packets associated with the call signal to the redirected address according the redirect mode, and
      replacing the second MIB object with the third MIB object for disabling the redirect mode.

9. The EMTA of claim 8, wherein the processor is further configured for transmitting a signal to a cable modem termination system (CMTS) for setting up two service flows.

10. The EMTA of claim 9, wherein the CMTS responds to the EMTA with the two service flows, wherein a first service flow is between the EMTA and the redirected address and a second service flow is between the EMTA and the originating endpoint.

11. The EMTA of claim 9, wherein the voice packets associated with the call signal freely flow across the two service flows.

12. The EMTA of claim 9, wherein upon receiving a hang up signal, the EMTA for transmitting a hang up signal to the CMTS for deleting the two service flows.

13. The EMTA of claim 8, wherein upon receiving a MIB object specifying normal call processing, the processor for receiving voice packets from a call and for forwarding the voice packets to at least one of a coupled telephone, computer softphone, and wireless telephone.

14. A communications system comprising:
   an embedded media terminal adapter (EMTA) for:
      receiving management information base (MIB) objects from an operations center, wherein a first MIB object specifies a redirect address, a second MIB object specifies enabling a redirect mode, and a third MIB object specifies disabling the redirect mode,
      receiving a call signal from an originating endpoint,
      redirecting voice packets associated with the call signal to the redirected address, wherein the MIB objects are stored in a MIB objects table, wherein each MIB object is stored with an associated operation identification number, wherein the operation identification number associated with the first MIB object is a numerical representation of the redirect address and the operation identification number associated with the second MIB object is a numerical representation of the redirect mode, and
      replacing the second MIB object with the third MIB object for disabling the redirect mode.

15. The communications system of claim 14, further comprising: a CMTS for setting up two service flows in response to an EMTA dynamic service add signal, wherein a first service flow is between the EMTA and the redirected address and a second service flow is between the EMTA and the originating endpoint.

16. The communications system of claim 15, wherein the voice packets associated with the call signal freely flow across the two service flows.

17. The communications system of claim 14, wherein upon receiving a hang up signal, the EMTA for transmitting a hang up signal to the CMTS for deleting the two service flows.

18. The communications system of claim 14, wherein analysis of the voice packets received by the redirected address is performed.

19. The communications system of claim 14, the EMTA for transmitting the voice packets to at least one of a coupled telephone, computer softphone, and wireless telephone, and for transmitting voice packets received from the at least one of the coupled telephone, computer softphone, and wireless telephone to the redirected address and the originating endpoint.

20. The communications system of claim 14, the EMTA for receiving a MIB object specifying normal call processing, wherein the EMTA receives voice packets from a call and forwards the voice packets to a coupled telephone, and wherein the EMTA forwards voice packets received from the coupled telephone to the originating endpoint.

\* \* \* \* \*